(12) United States Patent
Kawasaki

(10) Patent No.: US 6,409,468 B1
(45) Date of Patent: Jun. 25, 2002

(54) TURBO-MOLECULAR PUMP

(75) Inventor: Hiroyuki Kawasaki, Tokyo (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 09/647,466
(22) PCT Filed: Jun. 30, 1999
(86) PCT No.: PCT/JP99/03524
 § 371 (c)(1),
 (2), (4) Date: Sep. 29, 2000
(87) PCT Pub. No.: WO00/00746
 PCT Pub. Date: Jan. 6, 2000

(30) Foreign Application Priority Data

Jun. 30, 1998 (JP) .............................. 10-199668

(51) Int. Cl.[7] ................................ F04D 1/04
(52) U.S. Cl. ....................... 415/71; 415/72; 415/90; 415/199.3; 415/199.4; 415/199.6
(58) Field of Search ................. 415/71, 72, 90, 415/198.1, 199.4, 199.6, 199.3, 199.2, 208.1; 416/236 R

(56) References Cited

U.S. PATENT DOCUMENTS 3,969,039 A * 7/1976 Shoulders .................. 417/244
4,309,143 A * 1/1982 Klatt et al. ................. 415/90
4,732,529 A * 3/1988 Narita et al. ................ 415/90
RE33,129 E * 12/1989 Mase et al. ................. 415/90
5,688,106 A * 11/1997 Cerruti et al. .............. 415/90
5,695,316 A * 12/1997 Schutz et al. ............... 415/90
5,924,841 A * 7/1999 Okamura et al. ........... 415/90

FOREIGN PATENT DOCUMENTS

JP 63085292 A * 4/1988
JP 4-224295 8/1992

* cited by examiner

Primary Examiner—Edward K. Look
Assistant Examiner—Ninh Nguyen
(74) Attorney, Agent, or Firm—Armstrong, Westerman & Hattori, LLP

(57) ABSTRACT

A compact turbo-molecular pump has a relatively short axial length and yet provides sufficient evacuation and compression capabilities. The turbo-molecular pump comprises a casing (10) which contains an exhaust vane section (L1) having rotary vanes (30) on a rotor section alternating with stationary vanes (32) on a stator section. The exhaust vane section comprises an axial exhaust vane section (L1) and a radial exhaust vane section (L2) disposed downstream of the axial exhaust vane section (L1).

9 Claims, 14 Drawing Sheets

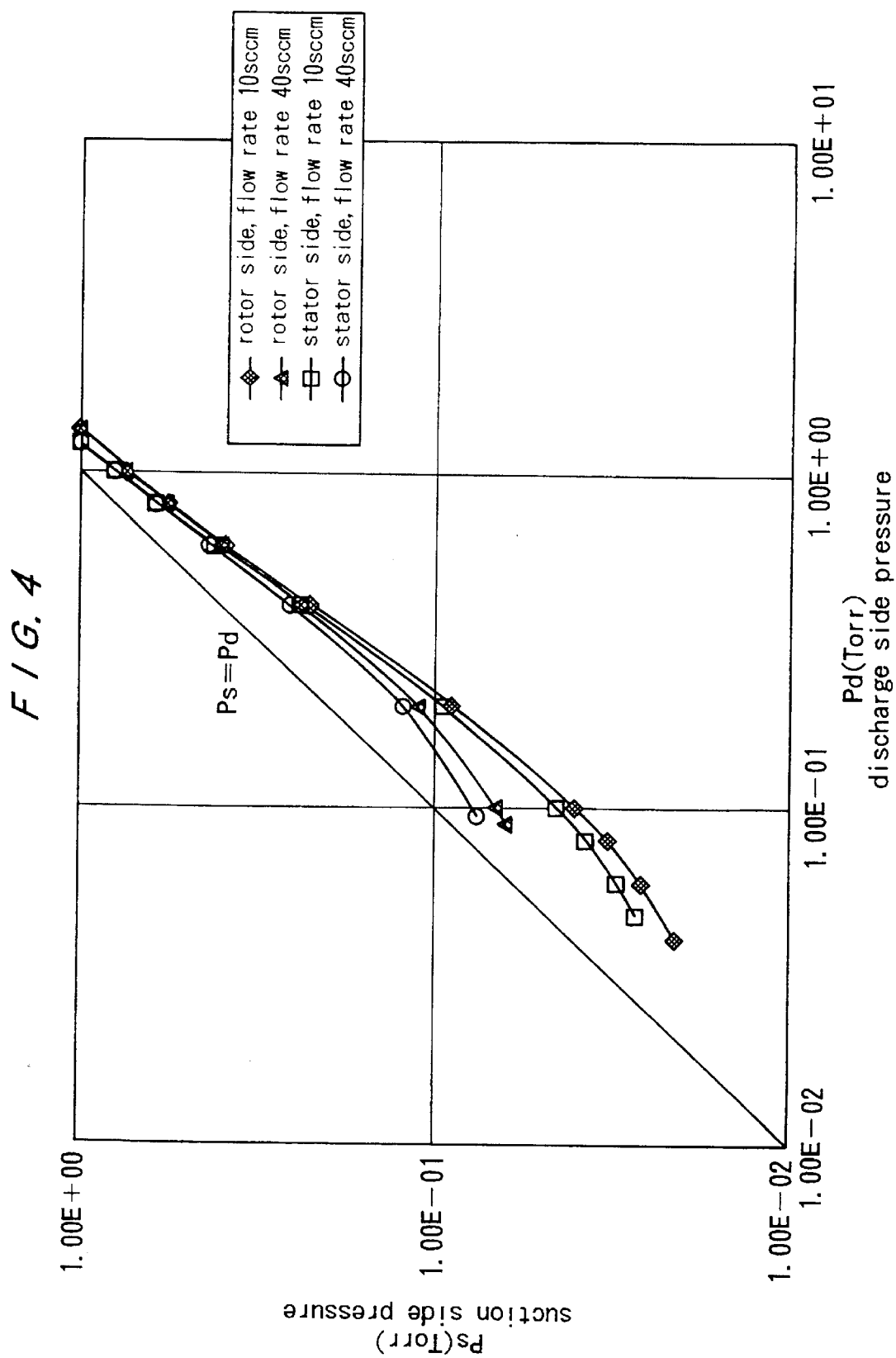

TURBO-MOLECULAR PUMP

TECHNICAL FIELD

The present invention relates to a compact turbo-molecular pump, for evacuating a processing chamber used in a semiconductor device manufacturing process, having a high evacuation capability.

BACKGROUND ART

A conventional turbo-molecular pump is shown in FIG. 14. The pump is comprised of a pump casing 10 housing a rotor (rotation section) R and a stator (stationary section) S to form an axial exhaust vane section $L_1$ and a screw groove exhaust section $L_3$. The bottom section of the pump casing 10 is covered with a base section 14, which is provided with an exhaust port 14a. The top section of the pump casing 10 communicates the pump with an apparatus or conduit to be evacuated through an upper flange section 12a. The stator S is comprised primarily by a fixed cylindrical section 16 erected in the center of the base section 14, and the stationary sections of the axial exhaust vane section $L_1$ and the screw groove exhaust section $L_3$.

The rotor R comprises a main shaft 18 inserted inside the fixed cylindrical section 16 and a rotating cylinder section 20 attached thereto. The drive motor 22, an upper radial bearing 24, a lower radial bearing 26 and an axial bearing 28 are provided on the opposing surfaces of the main shaft 18 and the fixed cylindrical section 16. The axial bearing 28 comprises a target disk 28a provided at the bottom of the main shaft 18 and upper and lower electrical magnets 28b provided on the stator S. This structure permits the rotor R to be rotated at high speeds under five-axial active controls.

Axial exhaust vane section $L_1$ includes an impeller comprising the rotary vanes 30 provided integrally with the upper outer periphery of the rotating cylinder section 20, and the stationary vanes 32 fixed on the interior of the casing 10 alternating with the rotary vanes 30, and produces evacuation action by the mutual interaction of the high-speed rotary vanes 30 and the stationary vanes 32.

A screw groove exhaust section $L_3$ is provided at a downstream location of the axial exhaust vane section $L_1$. In other words, the rotating cylinder section 20 has the screw groove section 54 having screw ridges 54a on its outer surface to surround the fixed cylindrical section 16, while, the stator S has a screw groove spacer 56 to surround the outer surface of the screw groove section 54. The screw groove exhaust section $L_3$ performs its evacuation action by the drag effect of the screw ridges 54a of the screw groove section 54 rotating at high speed.

By providing the screw groove exhaust section $L_3$ on a downstream side of the axial exhaust vane section $L_1$, the turbo-molecular pump is able to handle a wide-range of flow rates. Although the illustrated example provided the screw grooves of the screw groove exhaust section $L_3$ on the rotor side, the screw grooves may be provided on the stator side in some cases.

However, the volume of gas required by semiconductor processing apparatuses has been steadily increasing as a result of increasing wafer diameter, and consequently, the turbo-molecular pump has also been required to process an increasing volume of exhaust gas while maintaining the pressure inside the apparatus below a certain level and retaining a high compressive capability.

However, in the current technology, increase in the evacuation capacity is achieved through increasing the number of stages in the axial direction, causing the length and weight of the pump to increase. The result is not only a costly pump, but the valuable space inside a clean room begins to be occupied by the large pump apparatus. In addition, the safety of operation can be threatened if such a large rotor should fracture due to some difficulties because of the high dynamic torque being applied to the weighty pump.

DISCLOSURE OF INVENTION

It is an object of the present invention to provide a compact turbo-molecular pump that has a relatively short axial length and yet provides sufficient evacuation and compression capabilities.

The object has been achieved in a turbo-molecular pump comprising: a casing which contains an exhaust vane section having rotary vanes on a rotor section alternating with stationary vanes on a stator section, wherein the exhaust vane section comprises an axial exhaust vane section and a radial exhaust vane section disposed downstream of the axial exhaust vane section.

Accordingly, the overall performance of the present turbo-molecular pump is improved, because the present pump combines the axial exhaust vane section (exhibiting superior evacuation capability in the molecular flow region) with a radial exhaust vane section disposed in a downstream location operating at a higher pressure (exhibiting superior evacuation capability in a wide range of flow rates, from molecular flow to viscous flow regions). The radial exhaust vane section is, for example, made by placing the stationary vanes and rotary vanes in proximity and providing certain geometrical shaped ridges on the vanes so as to exhaust the gas in the radial directions by the effects produced by rotating vanes. A tortuous path in radial directions is thus created in multi-stages by having the rotary vanes alternating with the stationary vanes, and the pump performance (evacuation and compression characteristics) is improved without increasing the axial length of the pump. The surface irregularities such as ridges or grooves (protrusions or depressions) provided on the rotary vanes result in higher performance but they can be made much more readily on the stator side of the pump.

The radial exhaust vane section may comprise surface protrusions and depressions formed in a spiral shape on at least one of opposing surfaces of the stationary vanes or the rotary vanes. Impacting effect produced by such surface irregularities caused by rotation of the rotor section produces a superior evacuation efficiency. The radial exhausting structure is provided in the clearance space in the axial direction between the stationary vanes and the rotary vanes, therefore, compared with the screw type evacuation technique used in the conventional turbo-pump design, the pump performance is less sensitive to thermal or elastic deformation effects of the pump, and stable performance over a long service life of the pump is obtained.

In another aspect of the invention is a turbo-molecular pump comprising a casing which contains an exhaust vane section having rotary vanes on a rotor section alternating with stationary vanes on a stator section, wherein the exhaust vane section comprises a radial exhaust vane section, the radial exhaust vane section comprising surface irregularities formed in a spiral shape on at least one of opposing surfaces of the stationary vanes or the rotary vanes. The results of test by the inventors demonstrated that the gas evacuated toward the central region of the rotor section is able to overcome the centrifugal effects of the rotating vanes. Therefore, by having the rotary vanes alternating with the stationary vanes, a multi-stage tortuous path in the radial directions is created, and the pump performance is improved without increasing the axial length of the pump.

A screw groove exhaust section may be provided at an upstream location of the radial exhaust vane section for exhausting gases in an axial direction of the pump by means of screw grooves.

A screw groove exhaust section also may be provided at a downstream location of the radial exhaust vane section for exhausting gases in an axial direction of the pump by means of screw grooves.

The screw groove exhaust section may be provided between an inner surface of the rotor section and a fixed cylindrical section disposed on an inner side of the rotor section.

Stationary vanes and/or rotary vanes may be made of ceramics, titanium or titanium alloys. Such a pump would have improved strength, corrosion and thermal resistance.

BRIEF DESCRIPTION OF DRAWINGS

FIG. 4 is a performance graph of the pump;

BEST MODE FOR CARRYING OUT THE INVENTION

Figure 1:
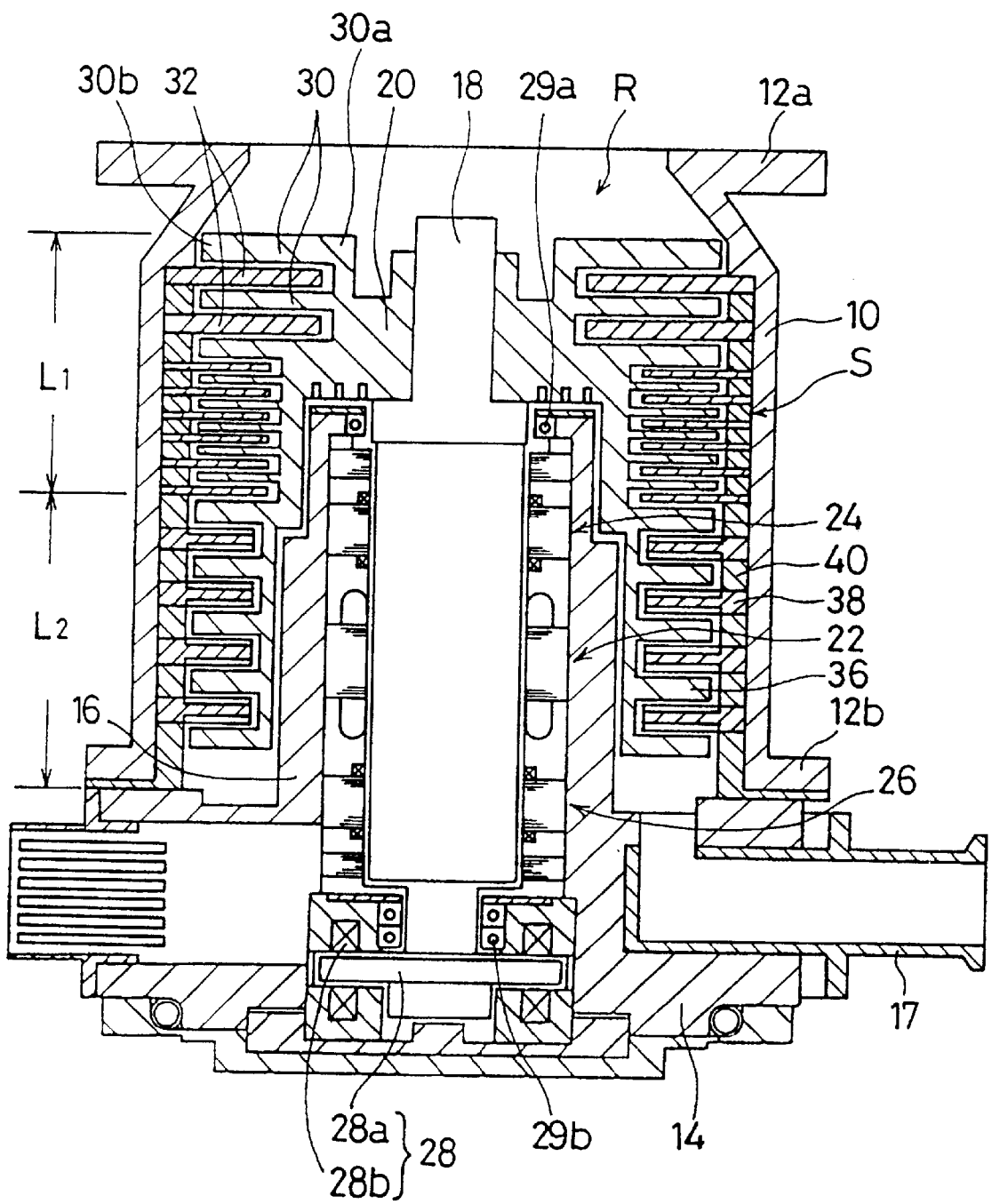
FIG. 1 is a cross sectional view of an embodiment of the turbo-molecular pump of the present invention.
Figure 2A:
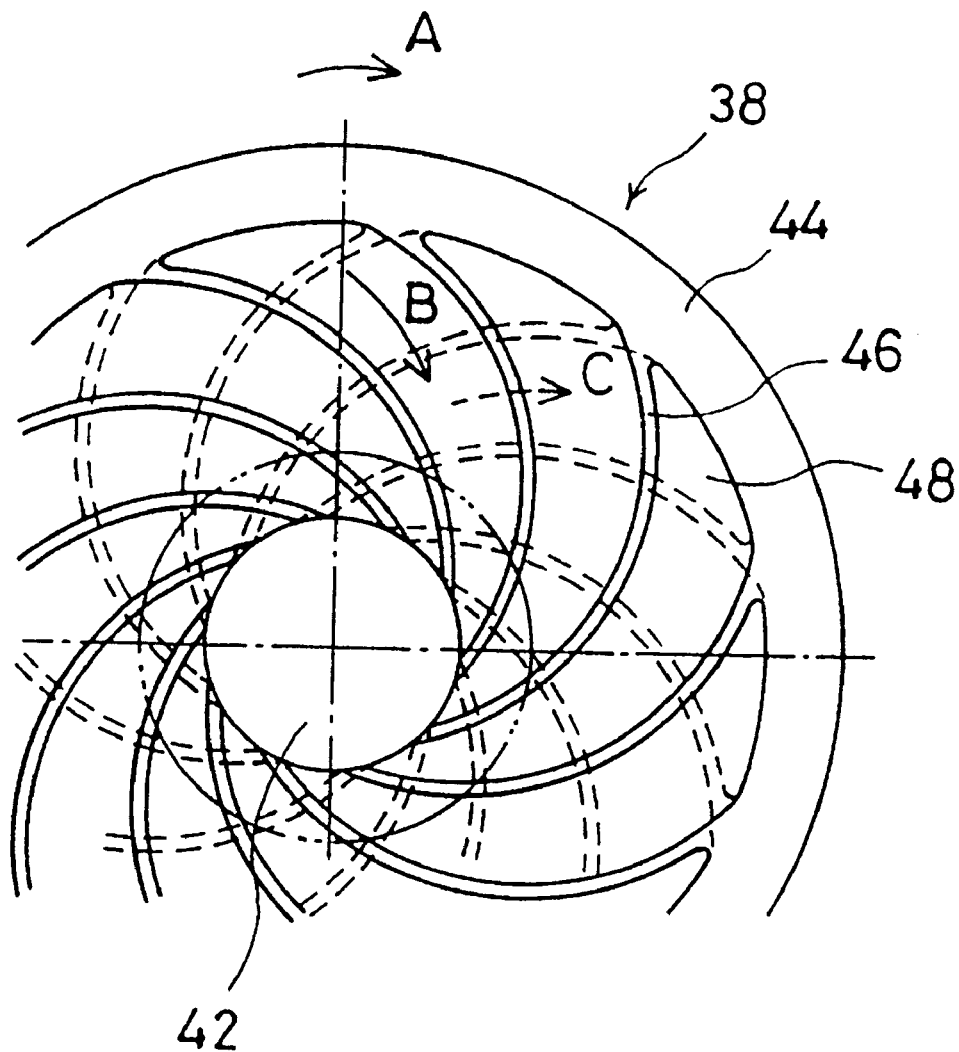
FIGS. 2A, 2B are a plan view and a side view of the stationary vanes of the pump shown in FIG. 1.
Figure 2B:
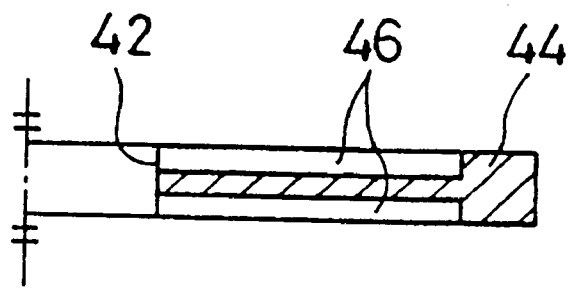

Preferred embodiments will be presented with reference to FIGS. 1 and 2. The turbo-molecular pump (pump hereinafter) comprises a pump casing 10 having a rotor section R and a stator section S, and an axial exhaust vane section $L_1$ and a radial exhaust vane section $L_2$ are provided between the two sections. The top and bottom sections of the casing 10 are provided with respective flanges 12a, 12b, and the upper flange 12a is attached to an apparatus or conduit to be evacuated.

The stator S comprises a base section 14 coupled with the lower flange 12b to cover the bottom section of the casing 10; a fixed cylindrical section 16 erected in the middle; and the stationary sections of the axial exhaust vane section $L_1$ and the radial exhaust vane section $L_2$. An exhaust opening 17 is provided on the base section 14. The rotor R includes a main shaft 18 inserted in the fixed cylindrical section 16, and a rotating cylinder section 20 attached to the shaft 18.

Between the outer surface of the main shaft 18 and the inner surface of the cylindrical section 16, a drive motor 22 for the rotor R, an upper radial bearing 24, a lower radial bearing 26 and an axial bearing 28 for providing a non-contact support to the rotor R are provided. Axial bearing 28 has a target disk 28a attached to the bottom of the main shaft 18, and also upper/lower electromagnets 28b on the stator S side. This structure of the pump enables the rotor R to be rotated at high speeds under five-axes active controls. Touch-down bearings 29a, 29b are provided at two locations, at top and bottom of the fixed cylindrical section 16, for providing a contact support to the rotor R when necessary.

The radial exhaust vane section $L_2$ is provided downstream of the axial exhaust vane section $L_1$, that is, below the section $L_1$, and has a similar structure to the axial exhaust vane section $L_1$. Disk-shaped rotary vanes 36 are integrally formed on the outer periphery of the rotating cylinder section 20, and on the inner periphery of the casing 10, stationary vanes 38 are provided to alternate with the rotary vanes 36. Each stationary vane 38 is fixed in place by being pressed at the edges from top and bottom by stationary vane spacers 40.

Each stationary vane 38 is a hollow disk and has a center hole 42, and as shown in FIG. 2, spiral shaped ridges 46 are provided to extend between the center hole 42 and the peripheral section 44 on the front surface as well as the back surface, and the grooves 48 formed between the ridges 46 spread out towards the outer periphery. When the spiral ridges 46 formed on the front surface (top surface) of the stationary vanes 38 are rotated in the direction of the arrow A, gas molecules are driven in the direction of the arrow B towards the inner side of the disk. On the other hand, on the back surface (bottom side) of the stationary vane 38, the spiral ridges 46 are arranged so as to transport the gas molecules towards the outer side of the disk in the direction of the arrow C, shown by broken lines in FIG. 2A. Each of such stationary vanes is normally formed in two half pieces, which are assembled together by inserting the spacers 40 and by alternating with rotary vanes 36, and the completed assembly is inserted inside the casing 10.

The configuration, formed by the stationary vanes 38 and the rotary vanes 36, produces a long path of exhausting flow of molecules flowing from top to bottom of the pump generated by the tortuous structure in the radial exhaust vane section $L_2$, although the length of the axial distance occupied is relatively short. Accordingly, the overall axial length of the pump is kept short without sacrificing the pump performance in high evacuation and compressive capabilities.

Figure 3A:
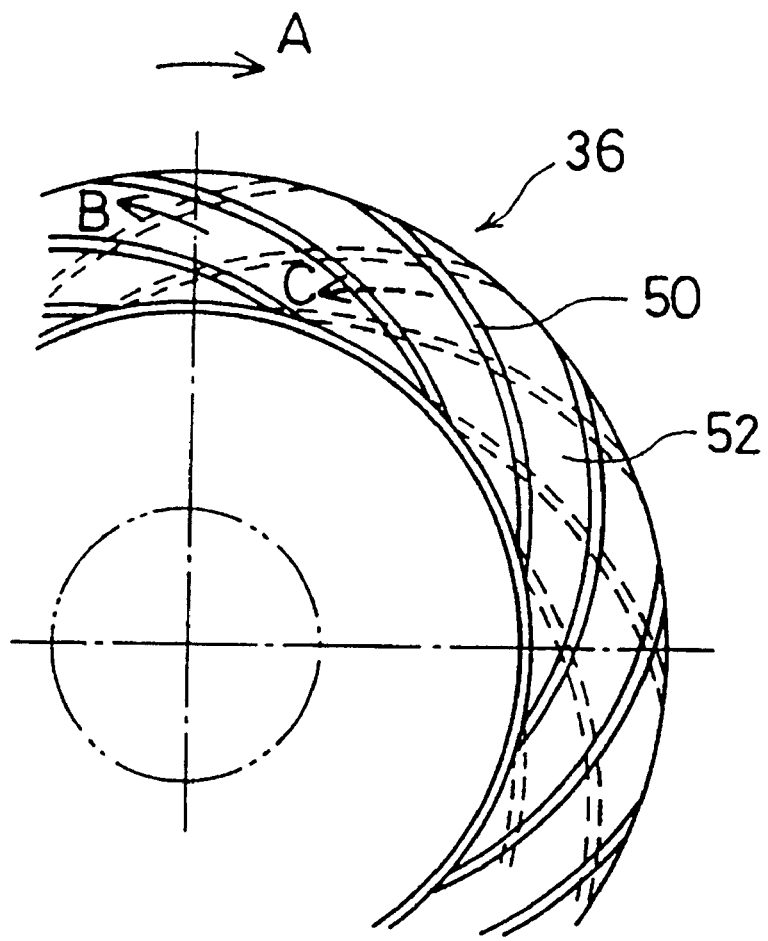
FIGS. 3A, 3B are a plan view and a side view of another embodiment of the rotary vanes.
Figure 3B:
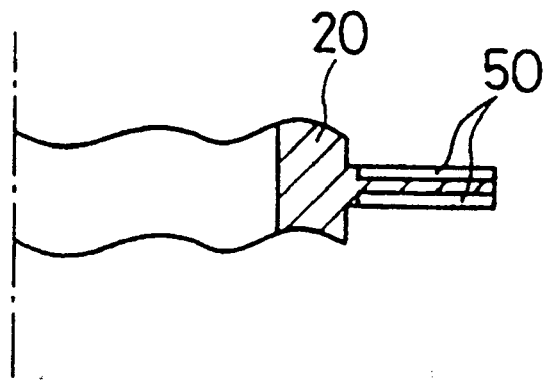

FIGS. 3A, 3B show another embodiment in which irregularities such as ridges 50 and the grooves 52 are formed on the surfaces of rotary vanes 36, and the surface of the stationary vanes 38 is shaped flat. When the spiral ridges 50 formed on the front surface of the rotary vanes 36 (upper surface) are rotated in the direction of the arrow A, gas molecules are driven in the direction of the arrow B towards the outer side of the disk. On the other hand, on the back surface (bottom side) of the stationary vane 38, the spiral ridges 50 are arranged so as to transport the gas molecules towards the inner side of the disk in the direction of the arrow C, shown by broken lines in FIG. 2A.

Similar to the previous embodiment, the pump in this embodiment also forms a tortuous path of exhausting flow of molecules in the radial exhaust vane section $L_2$ between the stationary vanes 38 and the rotary vanes 36 such that the high evacuation and compressive capabilities are maintained without increasing the overall length of the pump.

Figure 14:
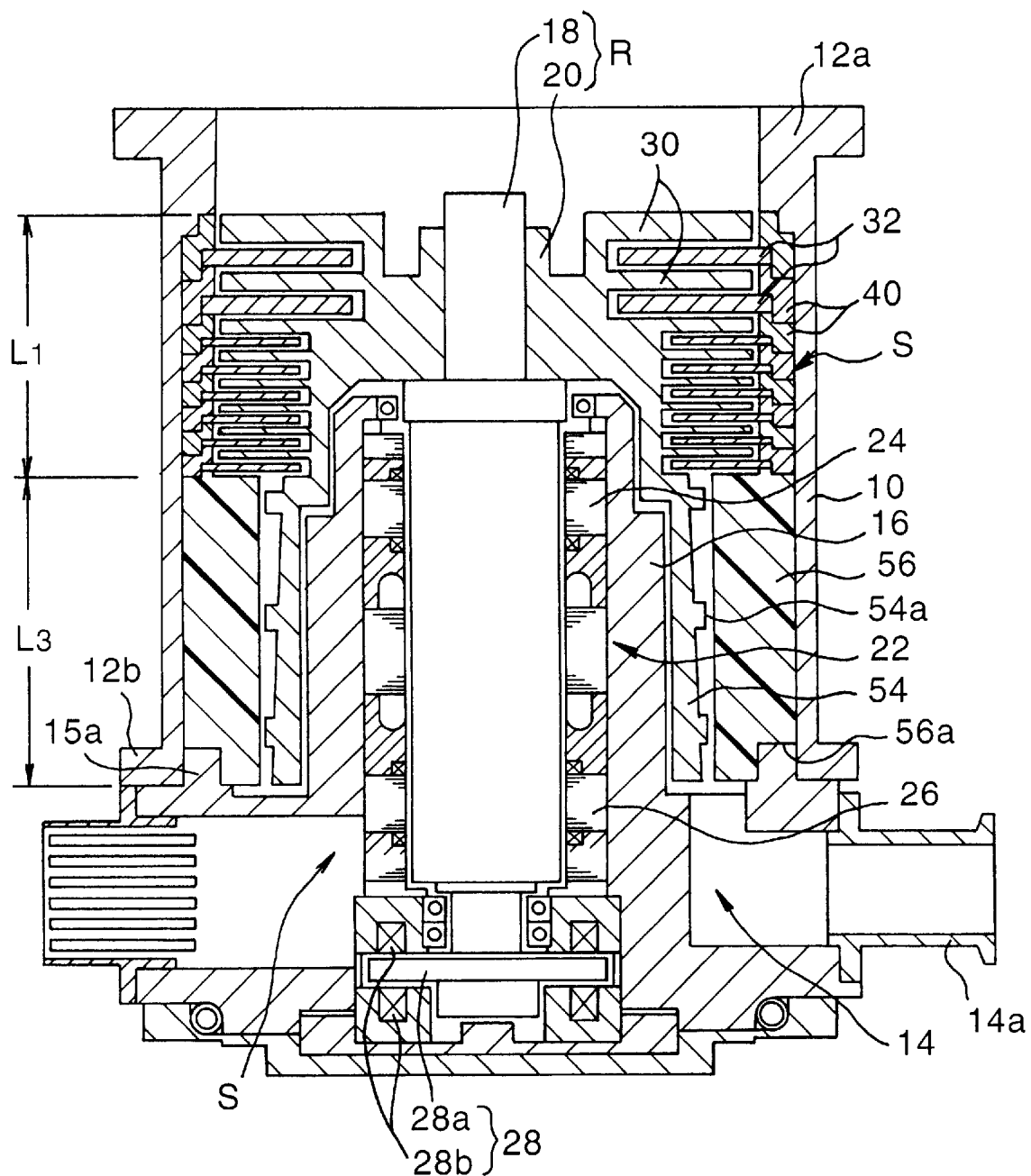
FIG. 14 is a cross sectional view of a conventional turbo-molecular pump.

When the present pump is compared to the conventional pump shown in FIG. 14, the following advantages are evident. In the pump shown in FIG. 14, the screw groove exhaust section $L_3$ has a radial clearance between the ridges 54a in the cylindrical screw groove section 54 and the screw groove spacer 56, and this clearance is susceptible to operational factors when the rotor R is operated at high speeds, such as elastic deformation and thermal deformation, and also creep deformation when the rotor is operated at high temperatures over prolonged periods. When any of such events occur, operational stability of the pump is affected. In contrast, the radial exhaust vane section $L_2$ in the present pump, the clearance is provided in the axial direction between the two disks so that the shaft and the casing are less susceptible to elastic load and temperature changes. Therefore, deformations caused by elastic, thermal and creep effects are less likely to occur and the clearance remains unaffected, thereby providing a stable operation of the pump, and thus, the pump also is more tolerant of overloading.

Figure 5:
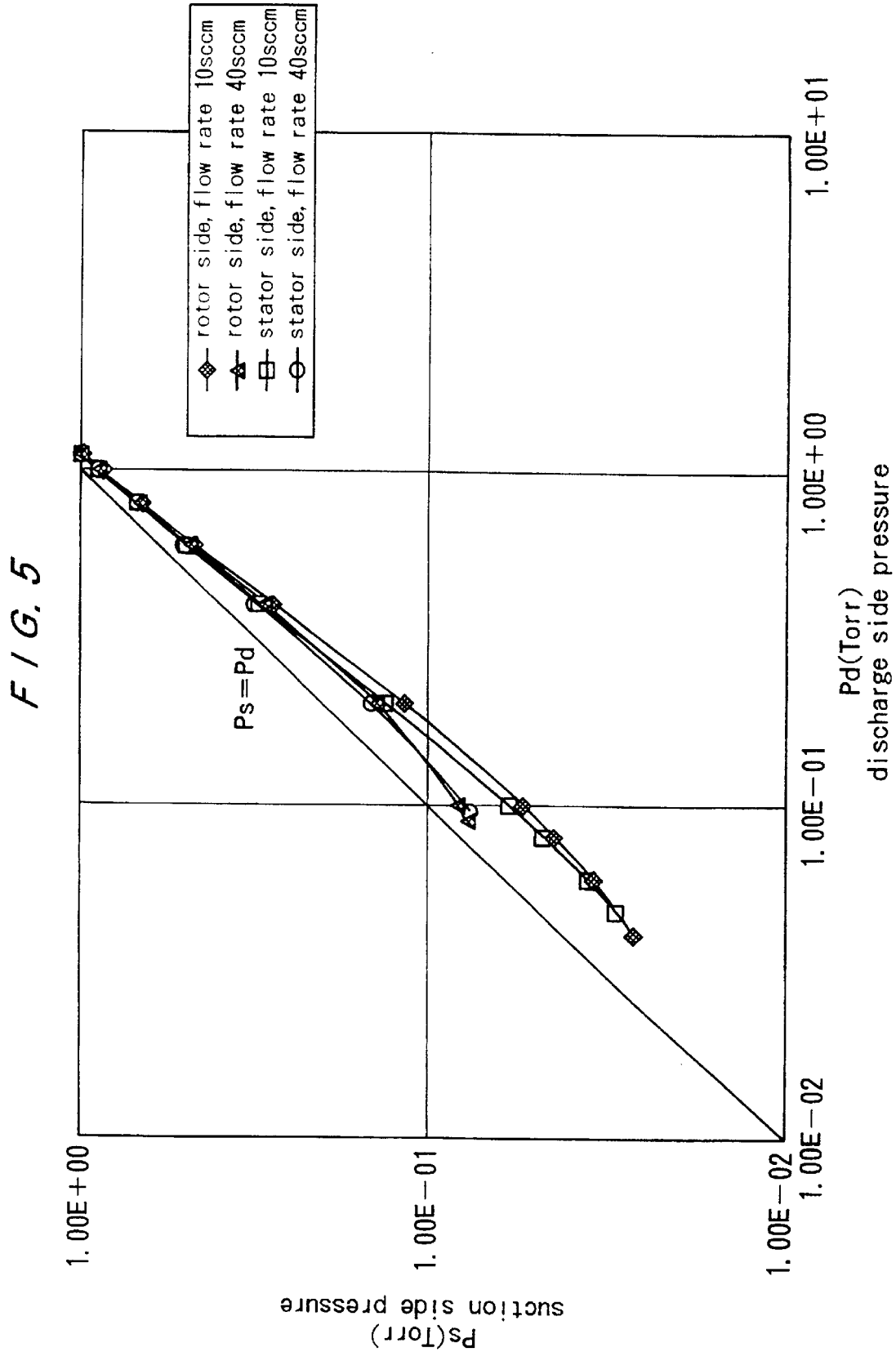
FIG. 5 is another performance graph of the pump.

FIGS. 4 and 5 show operational characteristics of a single stage of the radial exhaust vane in the present pump, showing the suction side pressure Ps on the vertical axis and the discharge side pressure Pd on the horizontal axis. The legends, "rotor side" and "stator side", relate respectively to that side of the surface where grooves or ridges are formed. In these tests, the pressures are measured at the entry point and exit point of an exhaust passage defined between rotary vane 30 and a stationary vane 32 disposed below the rotary vane 30. FIG. 5 shows the pressure Ps of a flow directed radially inwardly at the outer (suction) side and the pressure Pd of the flow directed radially inwardly at the inner (discharge) side in the exhaust passage defined between a rotary vane 30 and a stationary vane 32 disposed above the rotary vane 30.

In these graphs, the fact the measured values all lie below a line given by "Ps=Pd" indicates that, in either flow direction, evacuation performance is obtained by such configuration. In either case, the ultimate vacuum pressure obtainable is lower for the lower exhaust rate of evacuation.

Comparing FIGS. 4 and 5, it can be seen that the ultimate vacuum values are lower in FIG. 4, and therefore, evacuation efficiency is higher when the gas flows from the inner side to the outer side, rather than the opposite direction. It is considered that, when the gas is flowing from the outer side to the inner side, a compression effect is canceled by the centrifugal effect imparted on the gas molecules generated by friction with the rotary vane 38. In any event, since it is apparent that the compression effect exists in the exhaust passage from the outer side to the inner side, it can be assumed that this exhaust passage would not produce any negative evacuation effects. Therefore, by laminating the rotary and stationary disks in many stages, a tortuous path having a compression effect is formed in each of the stages to thus achieve high compression effect.

Compression capability of the pump is higher when the ridges 46 or the grooves 48 are formed on the rotor side than when they are formed on the stator side. It has been confirmed experimentally, and theoretical explanation is not clear. On the other hand, from the standpoint of ease of manufacturing, it is more difficult to produce such structures on the rotor R. If the spiral ridges are to be produced integrally with the rotor R, there is insufficient space for inserting a cutting tool in the axial direction, therefore, the tool must be inserted from a radial direction or fabrication must be performed by electric discharge machining. Such methods are time consuming compared with axial machining, and lead to high cost of manufacturing the pump. When the structures are to be produced on the stator side, each disk section can be separately produced so that the cost of manufacturing is about the same as the cost of making the pump in the conventional manner.

Figure 6:
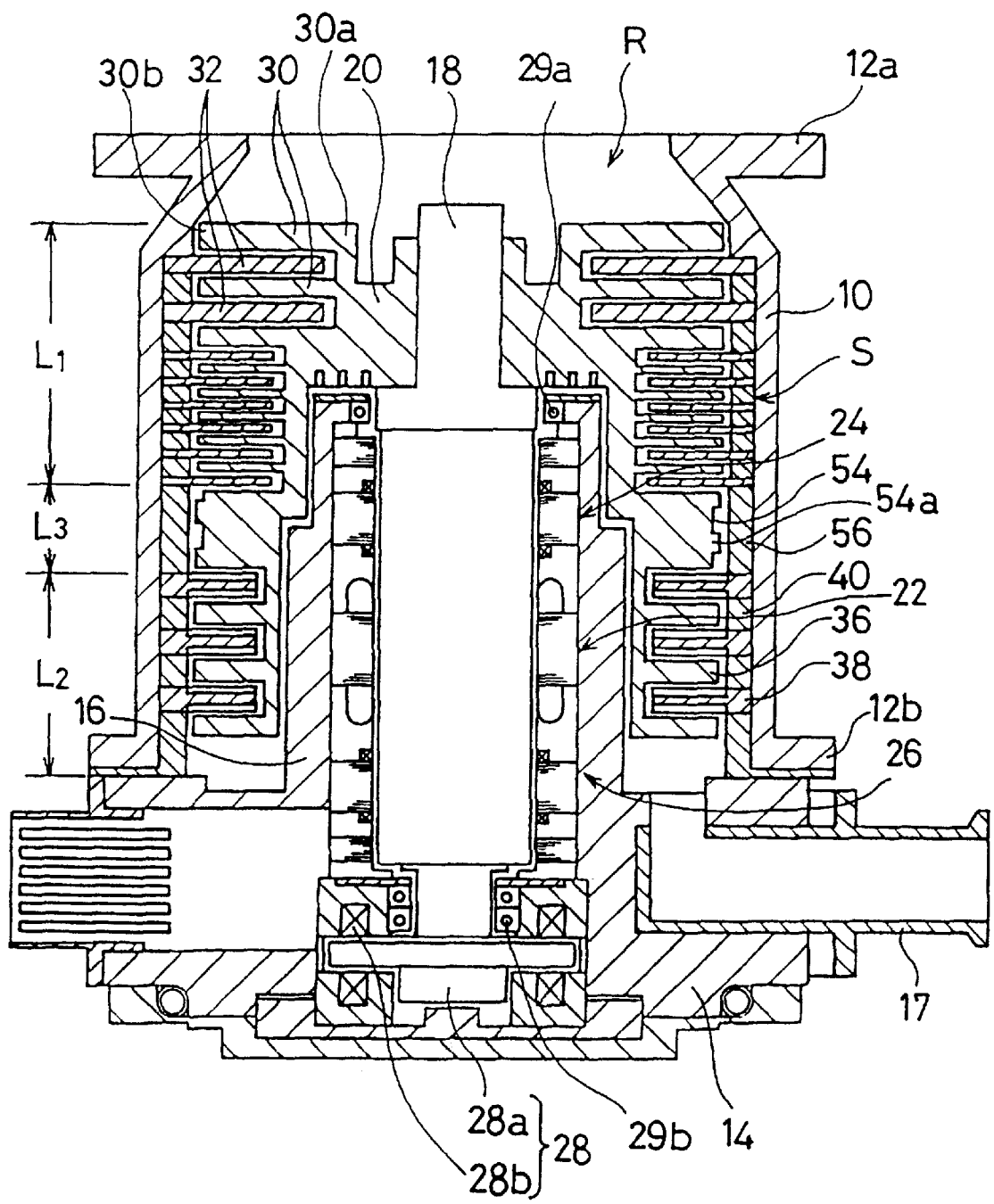
FIG. 6 is a cross sectional view of a third embodiment of the turbo-molecular pump of the present invention.
Figure 7:
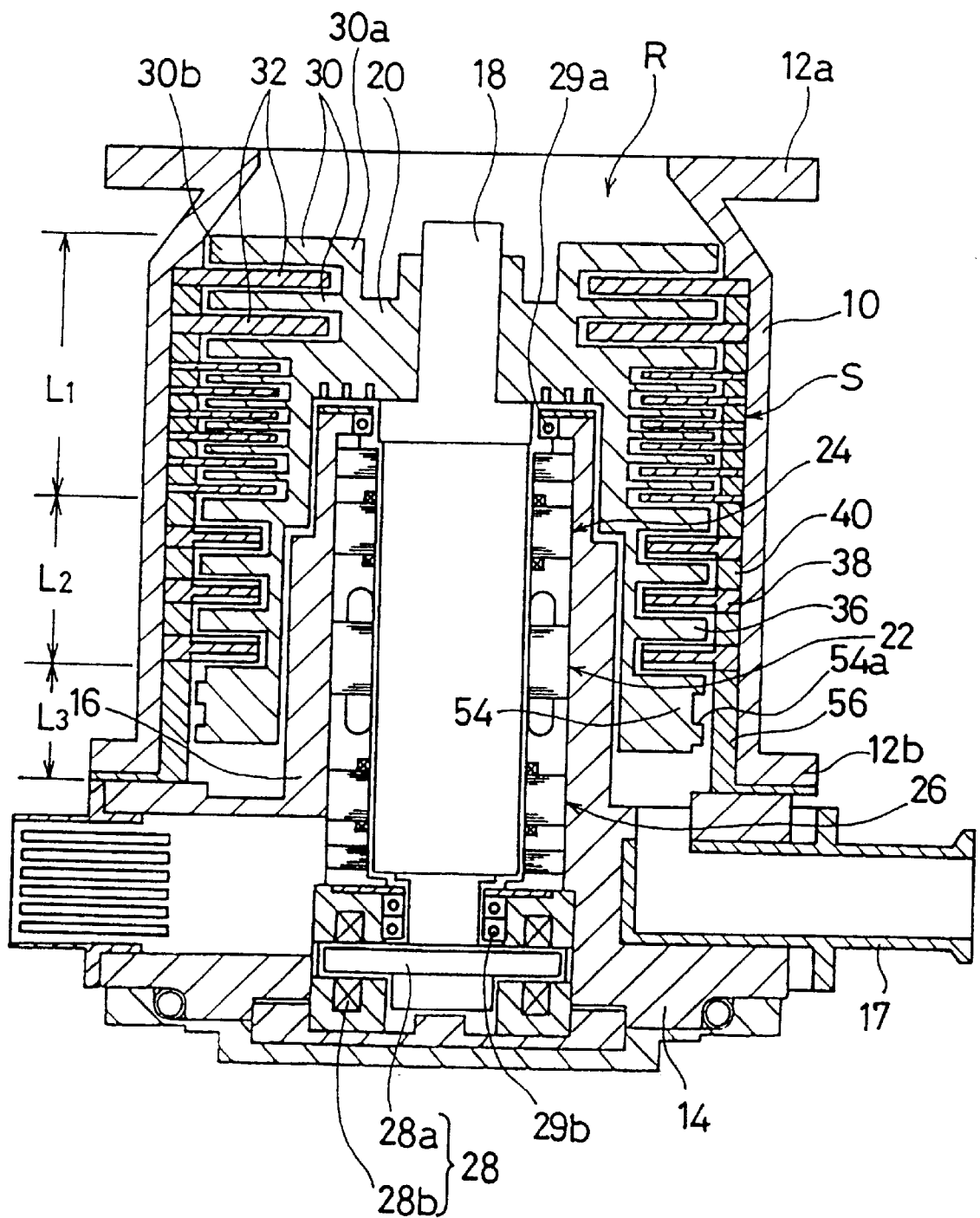
FIG. 7 is a cross sectional view of a fourth embodiment of the turbo-molecular pump of the present invention.
Figure 8:
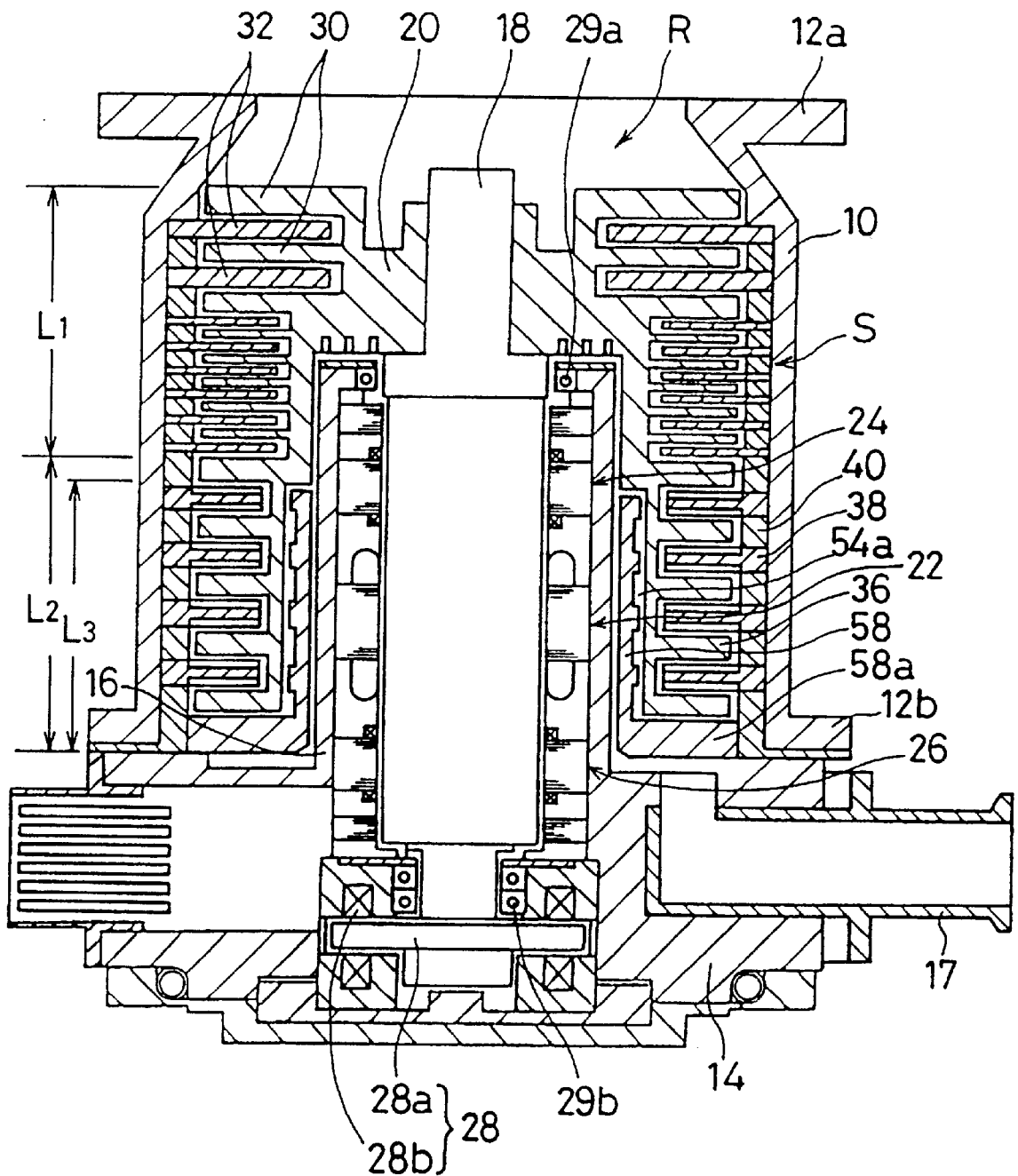
FIG. 8 is a cross sectional view of a fifth embodiment of the turbo-molecular pump of the present invention.

FIGS. 6 to 8 show another embodiment of the pump. FIG. 6 shows a three-stage pump having the screw groove exhaust section $L_3$ provided between the axial exhaust vane section $L_1$ and the radial exhaust vane section $L_2$. In this design, the gas is removed by the drag effect created between the screw ridges 54a provided on the outer surface in the central area of the cylinder section 20 and the opposing screw groove spacer 56 provided on the stator side. FIG. 7 shows another design in which the screw groove exhaust section $L_3$ is provided in the downstream location of the radial exhaust vane section $L_2$.

FIG. 8 shows another design in which the screw groove exhaust section $L_3$ is provided in a downstream location of the radial exhaust vane section $L_2$. The screw groove exhaust section $L_3$ is provided on the rear surface side of the rotating cylinder section 20 in the radial exhaust vane section $L_2$. In other words, a space is provided between the inner surface of the rotating cylinder section 20 (in the radial exhaust vane section $L_2$) and the outer surface of the fixed cylindrical section 16 of the stator S, and a screw exhaust section sleeve 58 having screw ridges 54a on its outer surface is inserted in this space. The screw exhaust section sleeve 58 is fixed above the base section 14 through a flange member 58a.

The screw ridges 54a are designed so as to transfer the gas in an upward direction utilizing the drag effect provided by the rotor R. An exhaust passage is thus formed extending from the bottom stage in the radial exhaust vane section $L_2$, ascending between the space formed by the rotating cylinder section 20 and the screw exhaust sleeve 58, and descending between the space formed by the screw exhaust sleeve 58 and the fixed cylindrical section 16 and reaching the exhaust opening 17. According to this design, the radial exhaust vane section $L_2$ and the screw groove exhaust section $L_3$ are provided in multi-stages in the axial direction so that a high performance pump is obtained without increasing the overall axial length of the pump.

Figure 9:
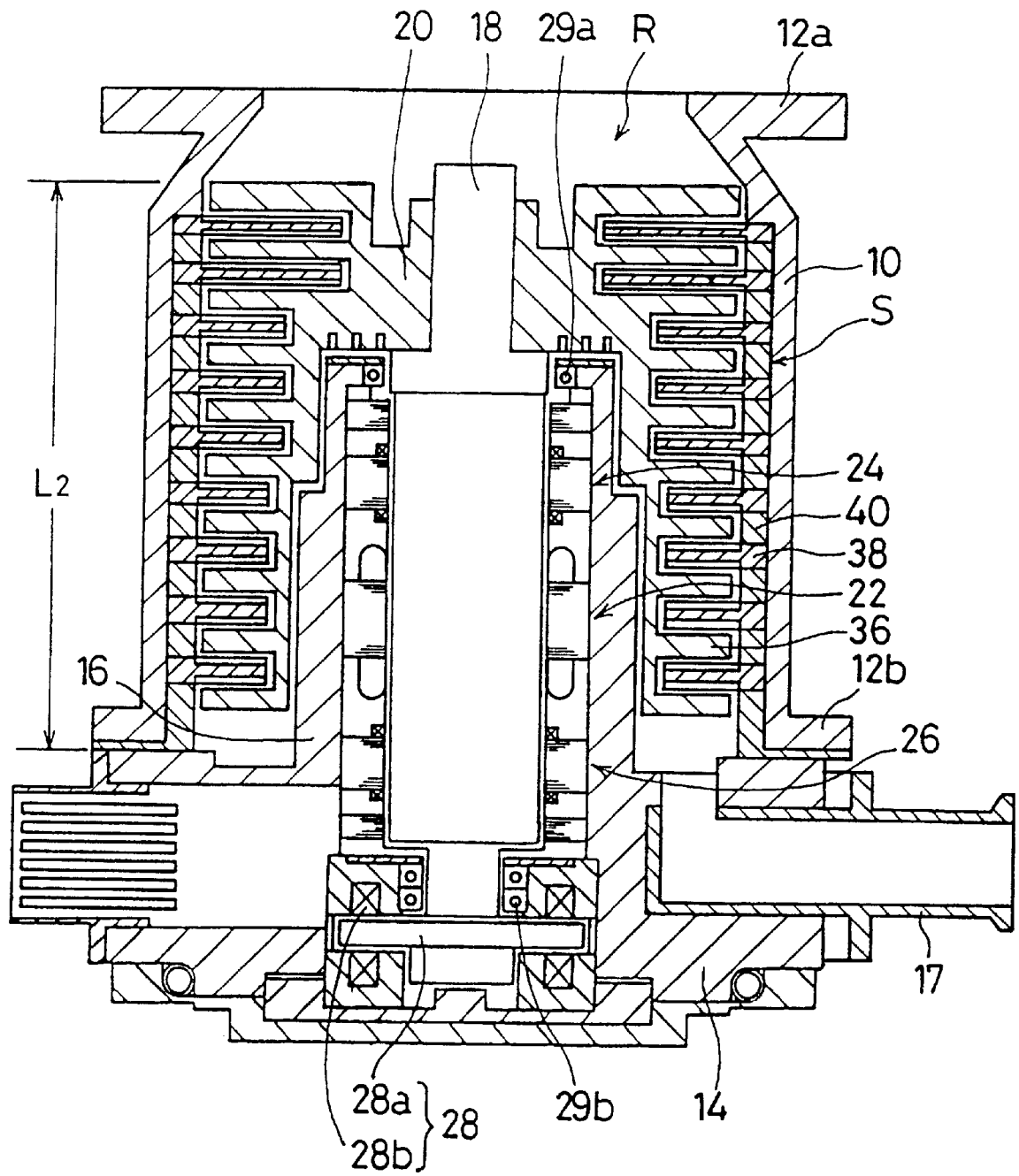
FIG. 9 is a cross sectional view of a sixth embodiment of the turbo-molecular pump of the present invention.

FIG. 9 shows still another embodiment of the pump that does not have the axial exhaust vane section so that the entire stage is made up by the radial exhaust vane section $L_2$. The feature of this design is that, compared with the pump that includes the axial exhaust vane section, this pump is capable of handling a larger volume of gas at a higher pressure range than the molecular flow range offered by normal turbo-molecular pumps.

Figure 10:
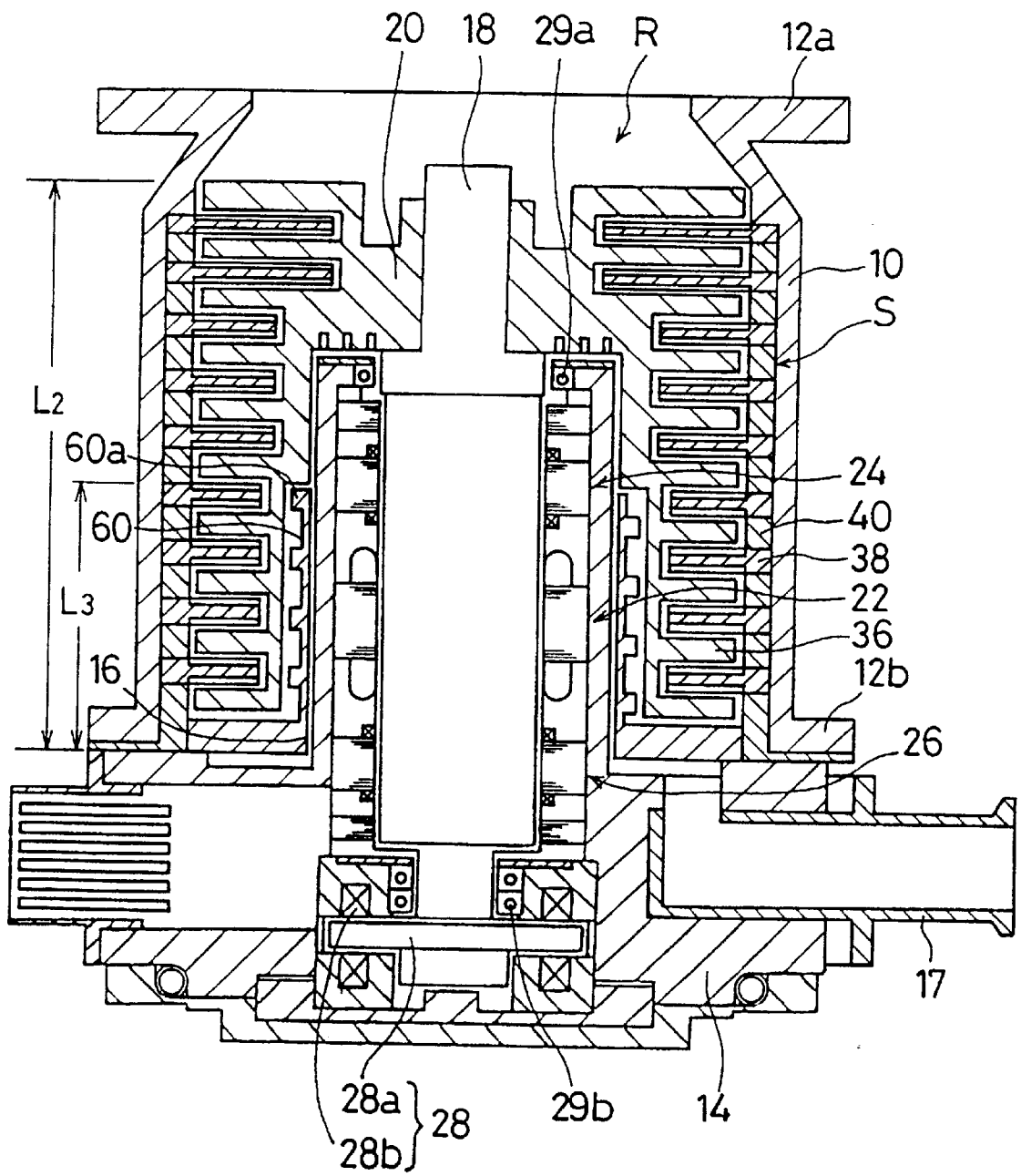
FIG. 10 is a cross sectional view of a seventh embodiment of the turbo-molecular pump of the present invention.

FIG. 10 shows still another embodiment of the pump having the screw groove exhaust section $L_3$ in the last stage of the pump shown in FIG. 9. A screw exhaust sleeve (second fixed cylindrical section) 60 is provided between the rotary cylinder section 20 and the fixed cylindrical section 16, and the spiral ridges 60a are formed on the outer surface of the second fixed cylindrical section 60, thereby forming the screw groove exhaust section $L_3$ between the rotary cylinder section 20 and the fixed cylindrical section 60. This design provides a looping exhaust passage extending in the axial direction so that a compact and high performance turbo-pump can be obtained.

Figure 11:
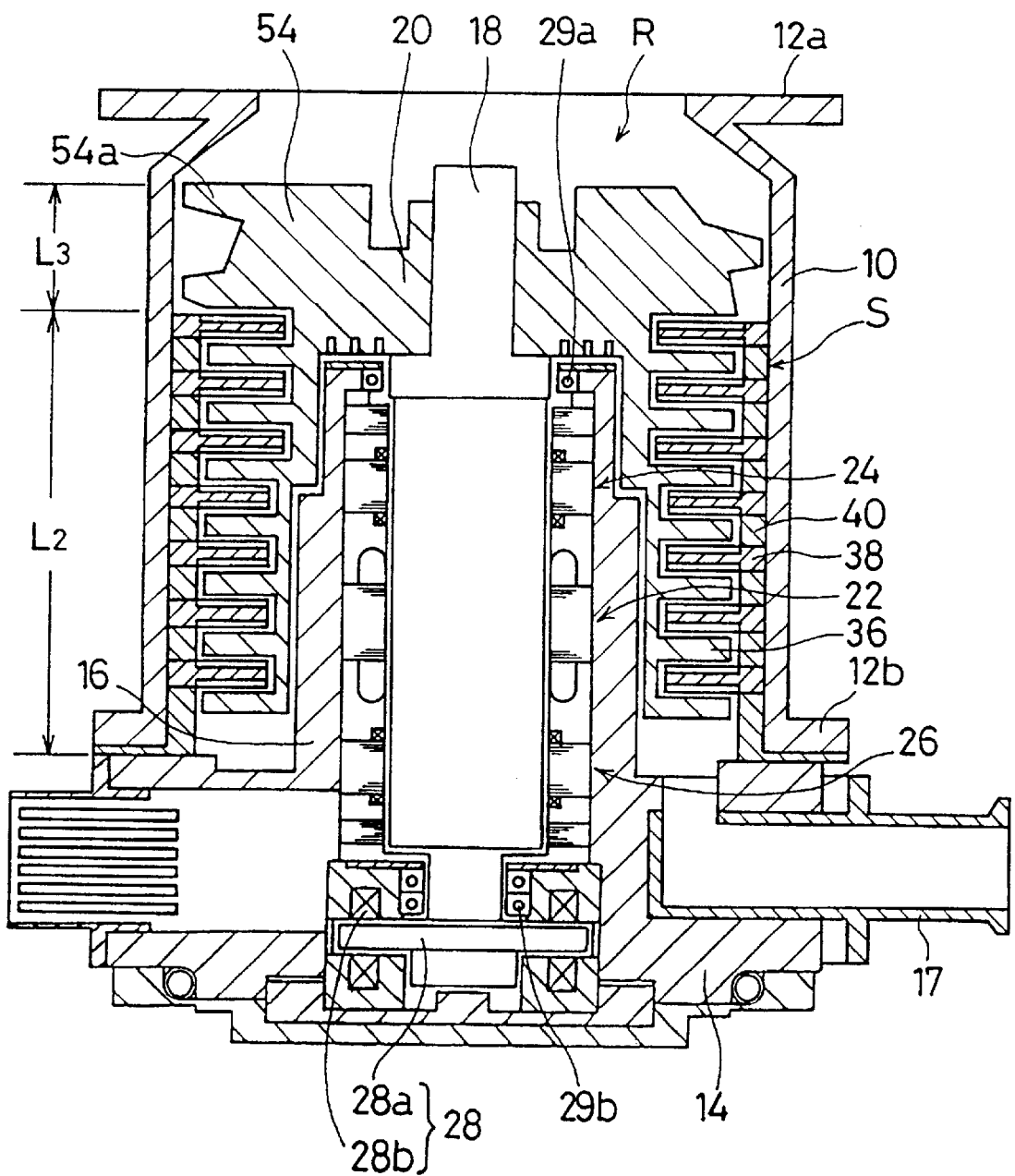
FIG. 11 is a cross sectional view of an eighth embodiment of the turbo-molecular pump of the present invention.

FIG. 11 shows still another embodiment of the turbo-molecular pump. A cylindrical screw groove section 54 having screw ridges 54a is provided in the fore-stage of the pump, and the radial exhaust vane section $L_2$ is provided in the aft-stage of the pump. Compared with the pump having a combination of the axial exhaust vane section $L_1$ and radial exhaust vane section $L_2$ shown in FIG. 1, this design provides the following advantages. The axial exhaust vane section is effective in the molecular flow pressure range while the cylindrical screw groove exhaust section is effective in the pressure range of 1~1,000 Pa so that the pump can be operated in the viscous flow range near atmospheric pressure.

Figure 12A:
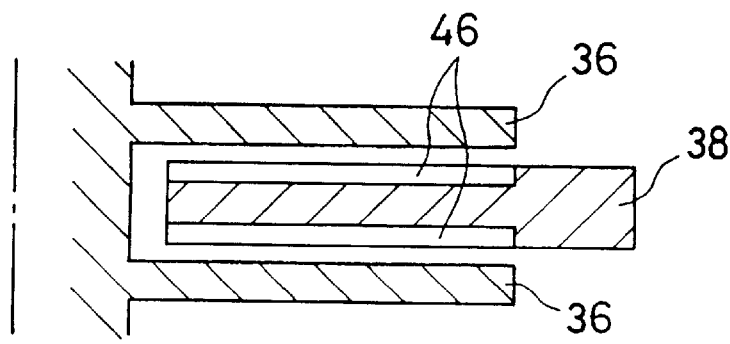
FIGS. 12A–12D are cross sectional views showing variations of vanes in the radial exhaust vane section.
Figure 12B:
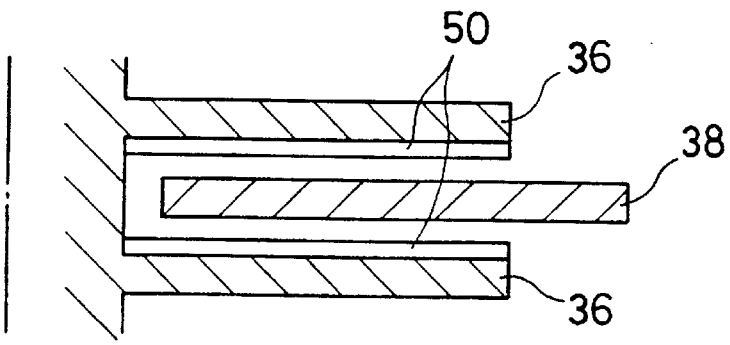
Figure 12C:
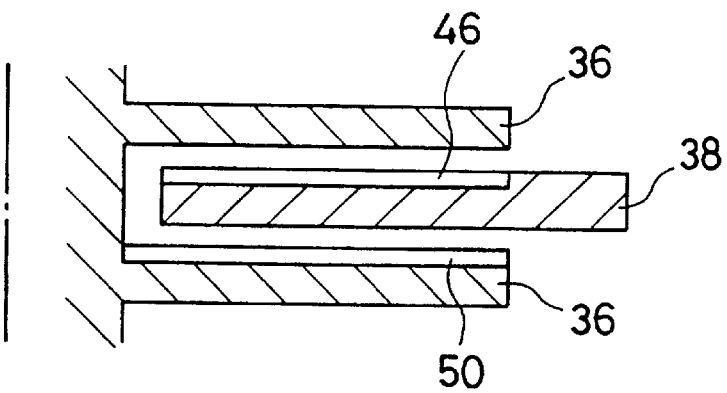
Figure 12D:
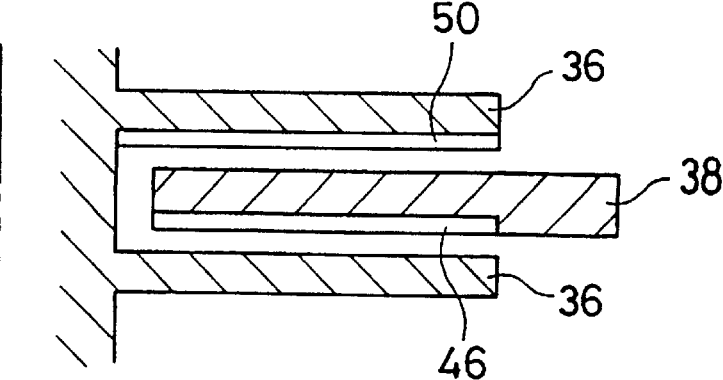
Figure 13A:
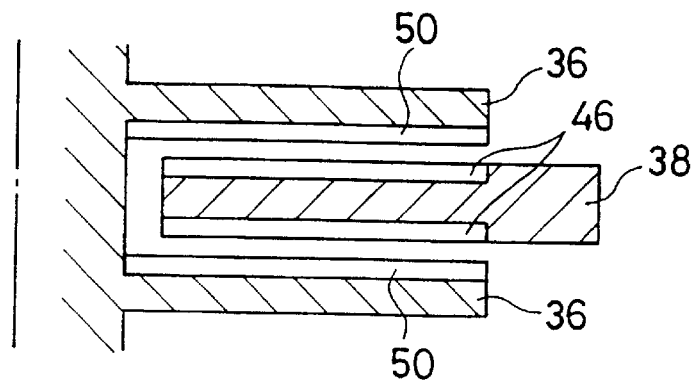
FIGS. 13A–13E are also cross sectional views showing variations of vanes in the radial exhaust vane section.
Figure 13B:
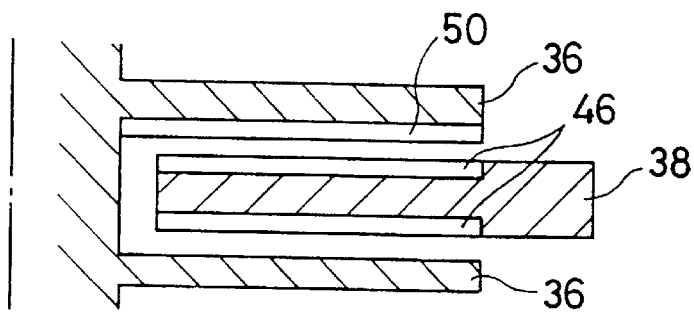
Figure 13C:
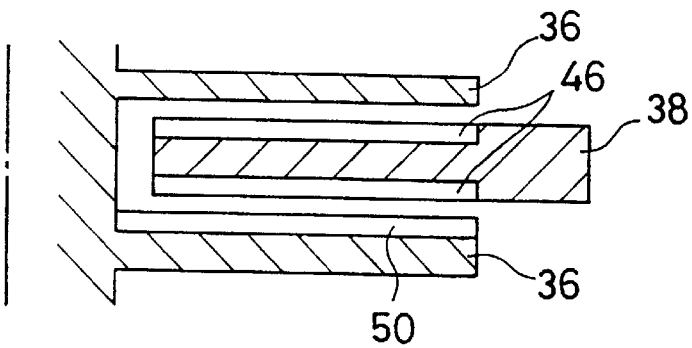
Figure 13D:
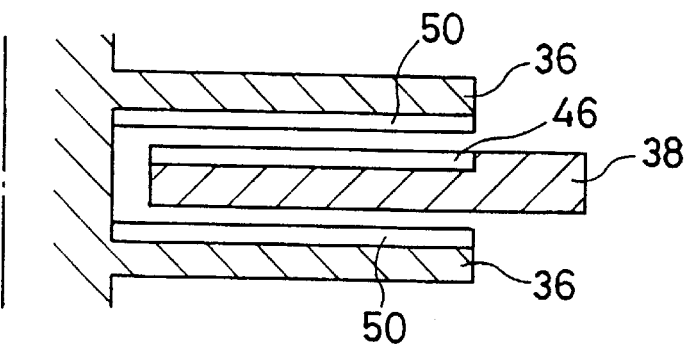
Figure 13E:
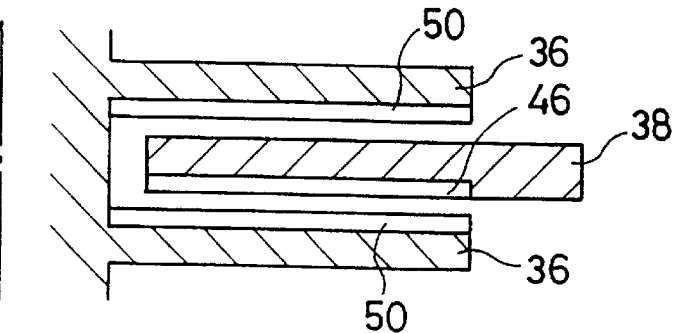

It should be noted that the spiral ridges 46, 50 are provided on one of the opposing surfaces of the stationary vanes 38 and rotating vanes 36 in the radial exhaust vane section $L_2$ as shown in FIG. 12A, for example, but spiral ridges 46, 50 may be provided on either the front or rear surface in various combinations as illustrated in FIGS. 12B~12D and in FIGS. 13A~13E in the radial exhaust vane section $L_2$.

It should be noted that, although the stationary and/or rotary vanes were made of aluminum and its alloys as a general construction material, but they can be made of ceramics, titanium or its alloys. Turbo-molecular pumps made of such materials would have superior strength, and corrosion and thermal resistance.

The present invention can provide a compact turbo-molecular pump that has a relatively short axial length and yet provides sufficient evacuation and compression capabilities. Thus, it can reduce an overall cost when it is applied to a semiconductor device manufacturing process where a clean room space cost is very expensive.

Industrial Applicability

The present invention is applicable to a turbo-molecular pump for evacuating a processing chamber used in a semiconductor device manufacturing process.

What is claimed is:

1. A turbo-molecular pump comprising:
   a casing, said casing containing an exhaust vane section including vanes, the vanes further comprising rotary vanes on a rotor section alternating with stationary vanes on a stator section,
   wherein said exhaust vane section comprises an axial exhaust vane section and a radial exhaust vane section disposed downstream of said axial exhaust vane section;
   wherein a screw groove exhaust section is provided at an upstream location of said radial exhaust vane section for delivering gases to said radial exhaust vane section by means of screw grooves.

2. A turbo-molecular pump according to claim 4, wherein said radial exhaust vane section comprises surface irregularities formed in a spiral shape on at least one of opposing surfaces of at least one of said vanes.

3. A turbo-molecular pump comprising:
   a casing, said casing containing an exhaust vane section including vanes, the vanes further comprising rotary vanes on a rotor section alternating with stationary vanes on a stator section,
   wherein said exhaust vane section comprises a radial exhaust vane section, said radial exhaust vane section comprising surface irregularities formed in a spiral shape on at least one of opposing surfaces of at least one of said vanes;
   wherein a screw groove exhaust section is provided at an upstream location of said radial exhaust vane section for delivering gases to said radial exhaust vane section by means of screw grooves.

4. A turbo-molecular pump according to any of claim 2, 1, or 3, wherein a screw groove exhaust section is provided at a downstream location of said radial exhaust vane section for delivering gases by means of screw grooves.

5. A turbo-molecular pump according to claim 4, wherein said screw groove exhaust section is provided between an inner surface of said rotor section and a fixed cylindrical section disposed on an inner side of said rotor section.

6. A turbo-molecular pump according to any of claim 2, 1, or 3, wherein stationary vanes and/or rotary vanes are made of ceramics, titanium or titanium alloys.

7. A turbo-molecular pump comprising:
   a casing, said casing containing an exhaust vane section including vanes, the vanes further comprising rotary vanes on a rotor section alternating with stationary vanes on a stator section,
   wherein said exhaust vane section comprises an axial exhaust vane section and a radial exhaust vane section disposed downstream of said axial exhaust vane section;
   wherein said radial exhaust vane section comprises surface irregularities formed in a spiral shape on at least one of opposing surfaces of at least one of said vanes;
   wherein said irregularities and depressions are provided on said rotary vanes.

8. A turbo-molecular pump comprising:
   a casing, said casing containing an exhaust vane section including vanes, the vanes further comprising rotary vanes on a rotor section alternating with stationary vanes on a stator section,
   wherein said exhaust vane section comprises a radial exhaust vane section, said radial exhaust vane section comprising surface irregularities formed in a spiral shape on at least one of opposing surfaces of at least one of said vanes;
   wherein said irregularities and depressions are provided on said rotary vanes.

9. A turbo-molecular pump according to claim 7 or 8, wherein said irregularities are provided on said stationary vanes.

* * * * *

UNITED STATES PATENT AND TRADEMARK OFFICE
CERTIFICATE OF CORRECTION

PATENT NO.     : 6,409,468 B1
DATED          : June 25, 2002
INVENTOR(S)    : Hiroyuki Kawasaki It is certified that error appears in the above-identified patent and that said Letters Patent is hereby corrected as shown below:

<u>Column 7,</u>
Line 1, please change "4" to -- 1 --.

Signed and Sealed this

Twelfth Day of November, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO.     : 6,409,468 B1
DATED          : June 25, 2002
INVENTOR(S)    : Hiroyuki Kawasaki It is certified that error appears in the above-identified patent and that said Letters Patent is hereby corrected as shown below:

Column 7,
Line 56, please change "4" to -- 1 --.

This certificate supersedes Certificate of Correction issued November 12, 2002.

Signed and Sealed this

Twenty-ninth Day of July, 2003

JAMES E. ROGAN
*Director of the United States Patent and Trademark Office*